(12) United States Patent
Delawar et al.

(10) Patent No.: US 12,012,899 B2
(45) Date of Patent: Jun. 18, 2024

(54) AUXILIARY COMPONENT MOVEMENT RESTRICTION MOUNTING SYSTEM FOR GAS TURBINE ENGINES

(71) Applicant: RAYTHEON TECHNOLOGIES CORPORATION, Farmington, CT (US)

(72) Inventors: Ahmad S. Delawar, Manchester, CT (US); Matthew D. Lombardo, Southington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/859,859

(22) Filed: Jul. 7, 2022

(65) Prior Publication Data

US 2024/0011441 A1    Jan. 11, 2024

(51) Int. Cl.
*F02C 7/32* (2006.01)
*F01D 25/24* (2006.01)
*F01D 25/28* (2006.01)

(52) U.S. Cl.
CPC .............. *F02C 7/32* (2013.01); *F01D 25/243* (2013.01); *F01D 25/28* (2013.01); *F05D 2240/14* (2013.01); *F05D 2260/31* (2013.01); *F05D 2260/4031* (2013.01)

(58) Field of Classification Search
CPC .......... F02C 7/32; F01D 25/243; F01D 25/28; B64D 27/26
See application file for complete search history.

(56) References Cited

U.S. PATENT DOCUMENTS

| | | | | |
|---|---|---|---|---|
| 5,275,357 A | * | 1/1994 | Seelen | B64D 27/26 60/797 |
| 5,303,880 A | * | 4/1994 | Cencula | B64D 27/26 244/54 |
| 5,435,124 A | * | 7/1995 | Sadil | F01D 25/285 248/220.21 |

(Continued)

FOREIGN PATENT DOCUMENTS

| | | |
|---|---|---|
| EP | 2530281 | 12/2012 |
| FR | 2923542 | 5/2009 |

OTHER PUBLICATIONS

European Patent Office, European Search Report dated Nov. 6, 2023 in Application No. 23183408.6.

*Primary Examiner* — David P. Olynick
(74) *Attorney, Agent, or Firm* — SNELL & WILMER L.L.P.

(57) ABSTRACT

An arrangement for mounting an auxiliary component to an engine case includes an engine case attachment flange, a side link, and first, second, and third fasteners. The first fastener is received through a first aperture disposed in a first end of the side link for coupling the side link to the auxiliary component. The second fastener is received through a second aperture disposed in a second end of the side link for coupling the side link to the engine case attachment flange. A third fastener is received through a third aperture disposed in the second end of the side link for restricting rotational movement of the side link, about the second fastener, with respect to the engine case attachment flange. In various embodiments, a stopping surface is provided at the first end of the side link to restrict rotational motion of the auxiliary component with respect to the side link.

19 Claims, 5 Drawing Sheets

(56) References Cited

U.S. PATENT DOCUMENTS

| | | |
|---|---|---|
| 6,357,220 B1 | 3/2002 | Snyder et al. |
| 8,251,309 B2 | 8/2012 | Sammito et al. |
| 2009/0294580 A1* | 12/2009 | Sammito ................ B64D 27/26 |
| | | 244/54 |
| 2012/0304811 A1* | 12/2012 | Niggemeier .............. F02C 7/32 |
| | | 74/606 R |
| 2017/0050738 A1* | 2/2017 | Butcher ................. B64D 27/12 |
| 2020/0157973 A1* | 5/2020 | Silva ...................... F01D 25/28 |

* cited by examiner

AUXILIARY COMPONENT MOVEMENT RESTRICTION MOUNTING SYSTEM FOR GAS TURBINE ENGINES

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a blade out event, which occurs when a blade (e.g., a fan, compressor, or turbine blade) breaks off an engine rotor body. A blade out event may also result in an imbalance in the engine rotor body which may cause outward deflection and a rotor body shaft imbalance. The mounting system may not be able to withstand the high shock load of a blade out event, causing separation of the auxiliary components from the engine casing. Or the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use light-weight materials as part of the gearbox hardware in order to reduce aircraft weight. On the other hand, the gearbox materials must be sufficiently strong and durable in order to withstand various loads. Blade out loads are often the limiting factor as part of a conventional gearbox design. A blade out may result in large rotor imbalance loads based on a blade becoming detached from a hub or rotor.

SUMMARY

An arrangement for mounting an auxiliary component to an engine case of a gas turbine engine is disclosed. In various embodiments, the arrangement includes an engine case attachment flange configured for attachment to a flange of the engine case, a side link comprising a first end and a second end, the second end is configured to be coupled to the engine case attachment flange, a first aperture disposed in the first end of the side link, a first fastener configured to be received through the first aperture, a second aperture disposed in the second end of the side link, a second fastener configured to be received through the second aperture for coupling the side link to the engine case attachment flange, a third aperture disposed in the second end of the side link, and a third fastener configured to be received through the third aperture for restricting rotational movement of the side link about the second fastener.

In various embodiments, the second aperture is located between the first aperture and the third aperture.

In various embodiments, a first gap is positioned between the third fastener and the side link.

In various embodiments, the first gap is an annular gap extending circumferentially about a radial outer surface of the third fastener.

In various embodiments, the first gap is configured to permit back and forth rotational movement, about a central axis extending through the second fastener, of the side link with respect to the engine case attachment flange.

In various embodiments, the third aperture is aligned with the first aperture and the second aperture.

In various embodiments, the arrangement further comprises an auxiliary component attachment flange, wherein the first end of the side link is configured to be coupled to the auxiliary component attachment flange via the first fastener.

In various embodiments, the arrangement further comprises a contact surface disposed at the first end of the side link, wherein the contact surface is configured to contact the auxiliary component in response to rotation of the side link with respect to the auxiliary component.

In various embodiments, a second gap is positioned between the contact surface and the auxiliary component.

In various embodiments, the second gap is configured to permit back and forth rotational movement, about a central axis extending through the first fastener, of the side link with respect to the auxiliary component attachment flange.

An arrangement for mounting an auxiliary component to an engine case of a gas turbine engine is disclosed. In various embodiments, the arrangement includes an engine case attachment flange configured for attachment to a flange of the engine case, a side link comprising a first end configured to be coupled to an auxiliary component attachment flange and a second end configured to be coupled to the engine case attachment flange, a first aperture disposed in the first end of the side link, a first fastener configured to be received through the first aperture for coupling the side link to the auxiliary component attachment flange, a second aperture disposed in the second end of the side link, a second fastener configured to be received through the second aperture for coupling the side link to the engine case attachment flange, and a contact surface disposed at the first end of the side link, wherein the contact surface is configured to contact the auxiliary component in response to rotation of the side link with respect to the auxiliary component.

In various embodiments, a first gap is positioned between the contact surface and the auxiliary component.

In various embodiments, the first gap is configured to permit back and forth rotational movement, about a central axis extending through the first fastener, of the side link with respect to the auxiliary component attachment flange.

In various embodiments, the arrangement further comprises a third aperture disposed in the second end of the side link and a third fastener configured to be received through the third aperture for restricting rotational movement of the side link about the second fastener.

In various embodiments, the second aperture is located between the first aperture and the third aperture.

In various embodiments, a second gap is positioned between the third fastener and the side link.

In various embodiments, the second gap is configured to permit back and forth rotational movement, about a central axis extending through the second fastener, of the side link with respect to the engine case attachment flange.

A gas turbine engine is disclosed. In various embodiments, the gas turbine engine includes an engine case, an engine case attachment flange coupled to the engine case, a gearbox comprising a gearbox attachment flange, a side link coupled between the gearbox attachment flange and the engine case attachment flange, a first aperture disposed in a first end of the side link, a first fastener configured to be received through the first aperture, a second aperture disposed in a second end of the side link, a second fastener configured to be received through the second aperture for coupling the side link to the engine case attachment flange, a third aperture disposed in the second end of the side link, and a third fastener configured to be received through the third aperture for restricting rotational movement of the side link about the second fastener with respect to the engine case attachment flange.

In various embodiments, the gas turbine engine further includes a contact surface disposed at the first end of the side link, wherein the contact surface is configured to contact the gearbox in response to rotation of the side link with respect to the auxiliary component.

In various embodiments, a first gap is positioned between the contact surface and the auxiliary component, the first gap is configured to permit back and forth rotational movement, about a central axis extending through the first fastener, of the side link with respect to the auxiliary component attachment flange.

In various embodiments, a second gap is positioned between the third fastener and the side link. The second gap is configured to permit back and forth rotational movement, about a central axis extending through the second fastener, of the side link with respect to the engine case attachment flange.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

An arrangement for mounting an auxiliary component, such as a gearbox for example, to an engine case of a gas turbine engine is provided, in accordance with various embodiments. The arrangement includes a pair of side links (e.g., one at each side of the auxiliary component) configured to restrict rotational movement of the auxiliary component with respect to the engine case, for example after a high load event (e.g., a blade out event, among others) which may cause other mounting components or the auxiliary component itself (e.g., a gearbox case) to fail. To prevent rotation or movement of the side link about the engine case, an offset pin is designed into the link and engine case attachment flange. To prevent rotation or movement of the side link about the auxiliary component attachment flange, the side link is contoured to the auxiliary component surface. In this manner, both points of rotation of the side link are restricted from rotation about their respective attachment points, thereby limiting rotation of the auxiliary component with respect to the engine case.

Figure 1A:
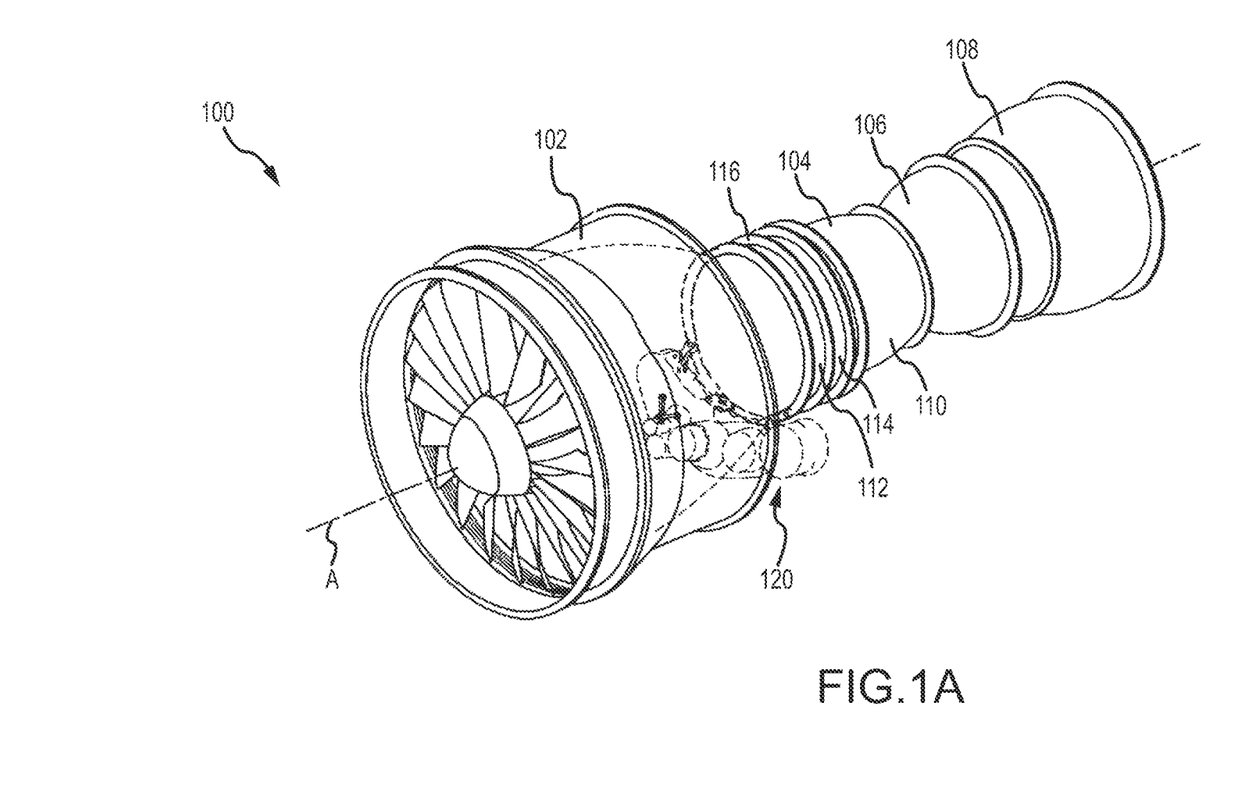
FIG. 1A provides a schematic perspective view of a gas turbine engine having a gearbox mounted to an external case of the gas turbine engine, in accordance with various embodiments.
Figure 1B:
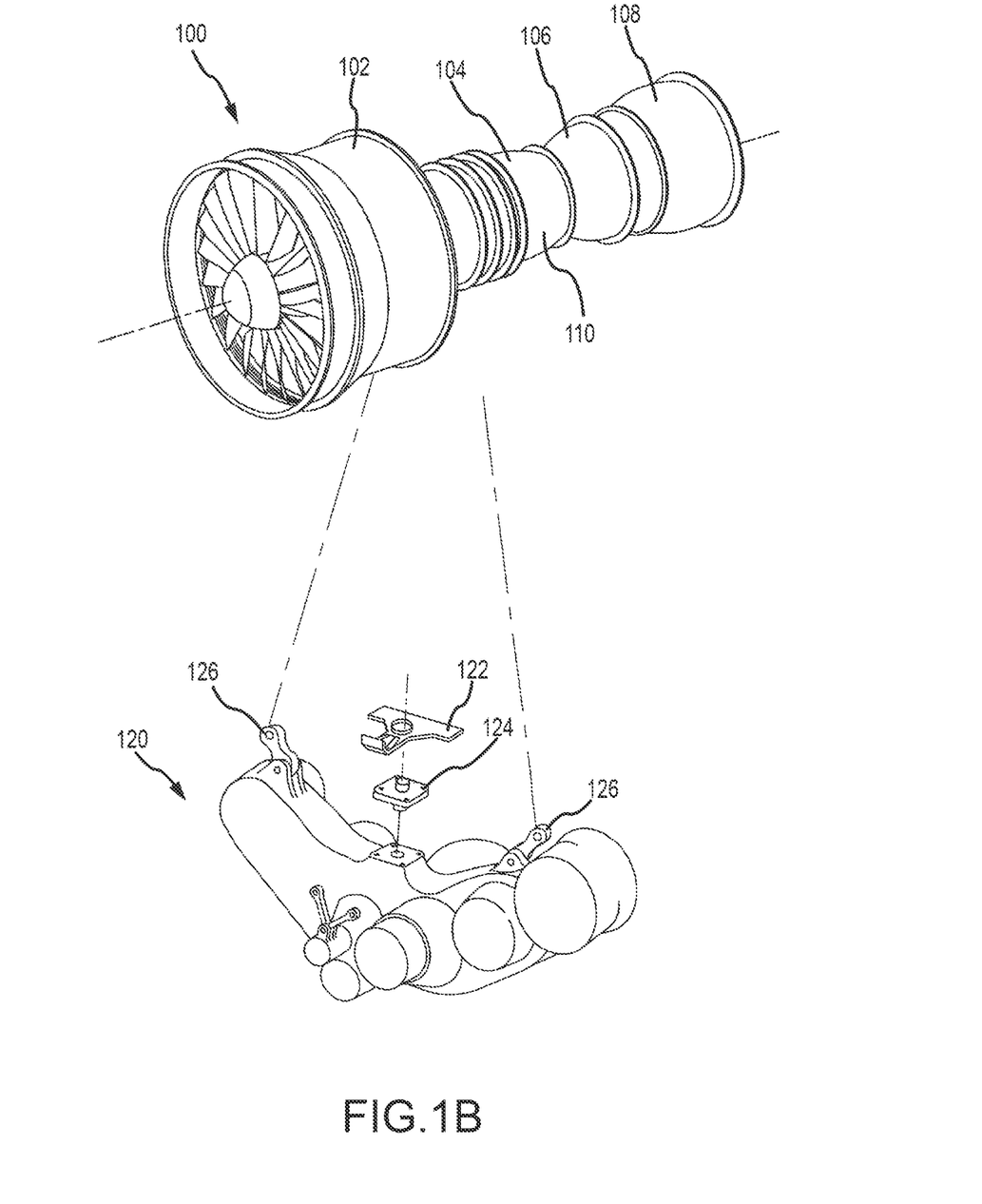
FIG. 1B provides a schematic exploded view of the gas turbine engine shown in FIG. 1A, and a gearbox mounting system for mounting the gearbox to the external case of the gas turbine engine, in accordance with various embodiments.

Referring now to the drawings, FIGS. 1A and 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, flange 116. A gearbox 120 is illustrated as being mounted to a forward end of the engine case 110 proximate the compressor section 104. Referring more particularly to FIG. 1B, the gearbox 120 is mounted to the engine case 110 via a support bracket 122 and a pin 124 configured to maintain the gearbox 120 in proper alignment and position with respect to the engine case 110. It should be understood that the illustrated support bracket 122 and pin 124 are provided as one of various examples for mounting and/or aligning the gearbox 120 to the engine case, and the present disclosure is not particularly limited in this regard. In various embodiments, one or more side links 126 are also used to mount the gearbox 120 to the engine case 110.

Figure 2:
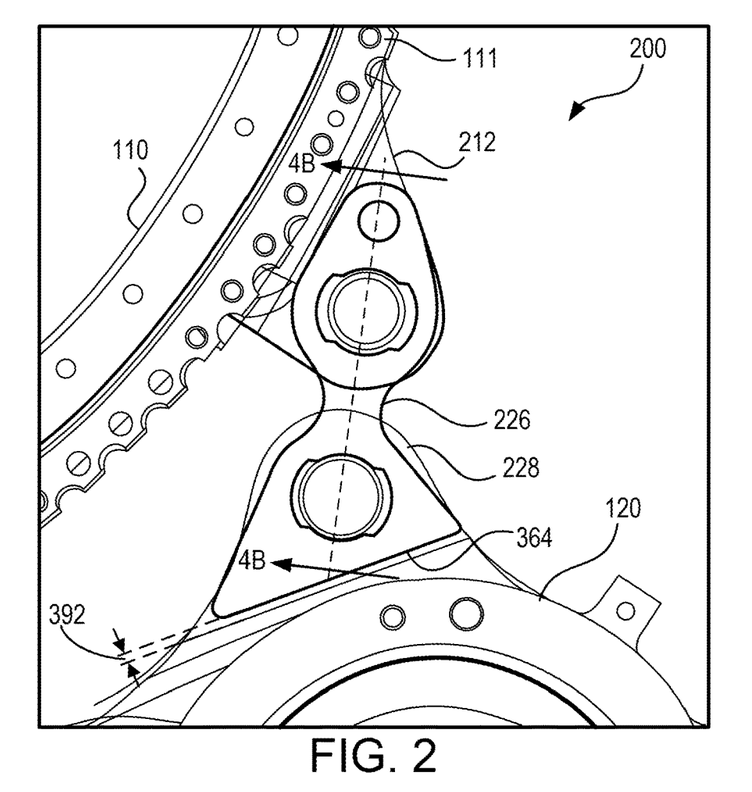
FIG. 2 provides a schematic view of a gearbox mounting arrangement, including a side link, mounted to a portion of an engine case, in accordance with various embodiments.

Referring now to FIG. 2, an arrangement 200 for mounting an auxiliary component to an engine case of a gas turbine engine including a side link 226 installed between the gearbox 120 and the engine case 110, is illustrated in accordance with various embodiments. In FIG. 2, the fasteners for the first, second, and third apertures are omitted for clarity purposes. In various embodiments, side link 126 of FIG. 1A and FIG. 1B is similar to side link 226. Gearbox 120 may comprise an attachment flange 228 (also referred to herein as a first attachment flange) whereby the side link 226 is coupled to the gearbox 120. In various embodiments, attachment flange 228 is integrally formed (e.g., monolithic) with the gearbox; although it is contemplated that attachment flange 228 may be removably coupled to the gearbox 120, in accordance with various embodiments. Engine case 110 may comprise an attachment flange 212 (also referred to herein as a second attachment flange) whereby the side link 226 is coupled to the engine case 110. In various embodiments, attachment flange 212 is removably coupled to the engine case 110; although it is contemplated that attachment flange 212 may be integrally formed (e.g., monolithic) with the engine case 110, in accordance with various embodiments. For example, attachment flange 212 may be configured for attachment to one or more flanges (e.g., flange 111) of the engine case 110. In this manner, side link 226 may extend between and to attachment flange 228 and attachment flange 212. Although described herein with respect to only one end of the gearbox, it should be understood that the opposite end of the gearbox may be provided with a second side link 226 as described herein (e.g., see first and second side links 126 in FIG. 1). In this regard, arrangement 200 may comprise a pair of side links 226, with one side link 226 at each opposing end of the gearbox 120.

Figure 3:
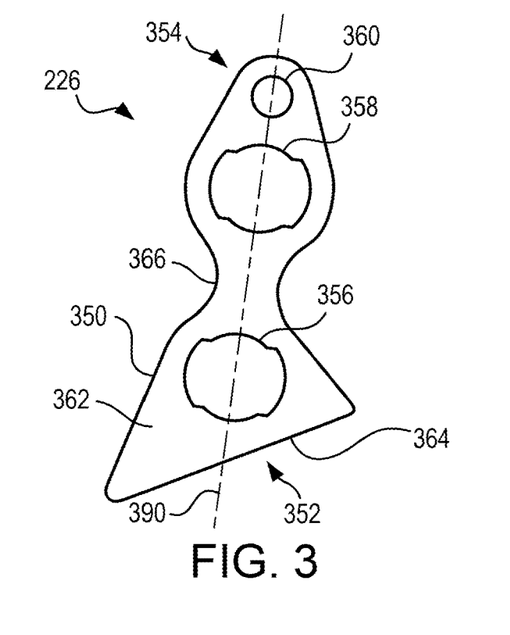
FIG. 3 provides a schematic axial view of a side link, in accordance with various embodiments.

With additional reference to FIG. 3, side link 226 may comprise a body 350 defining a first end 352 and a second end 354. A first aperture 356 may be disposed in the body 350 at the first end 352. A second aperture 358 may be disposed in the body 350 at the second end 354. A third aperture 360 may be disposed in the body 350 at the second end 354. In various embodiments, second aperture 358 is disposed between first aperture 356 and third aperture 360. In various embodiments, third aperture is aligned with the first aperture 356 and the second aperture 358 (e.g., the centerline axes of first aperture 356, second aperture 358, and third aperture 360 may be aligned along a longitudinal axis 390).

Body 350 may comprise generally planar opposing side surfaces (e.g., side surface 362 and the opposing side surface 363 (see FIG. 4B)). The side surface 362 may be oriented parallel with respect to the opposing surface. First aperture 356, second aperture 358, and third aperture 360 may extend from side surface 362 to the opposing side surface (i.e., completely through the body 350). In various embodiments, body 350 comprises a narrow waist 366 between first aperture 356 and second aperture 358.

In various embodiments, body 350 defines a contact surface 364 disposed at the first end 352. Contact surface 364 may define a terminus of the first end 352 of the body 350. First end 352 may be wider than second end 354, in accordance with various embodiments. With combined reference to FIG. 2 and FIG. 3, contact surface 364 may be configured to contact the gearbox 120 to restrict rotation of the side link 226 with respect to the gearbox 120. In various embodiments, contact surface 364 is contoured to the surface of gearbox 120. In various embodiments, with the side link 226 installed to the gearbox 120, a gap 392 may exist between contact surface 364 and gearbox 120. In this manner, a predetermined (e.g., minimal) amount of rotation between gearbox 120 and side link 226 may be allowed, for example to accommodate machining tolerances, thermal growth, vibration, or other factors which may cause minimal rotation of gearbox 120 with respect to side link 226. Stated differently, gap 392 may be configured to permit back and forth rotational movement, with respect to a central axis extending through fastener 474 (see FIG. 4A through FIG. 4D), of side link 226 within an operational design space. As described herein, first end 352 defines contact surface 364 which provides a stopping surface for restricting motion of gearbox 120 with respect to engine case 110 outside of the intended operational design space.

Figure 4A:
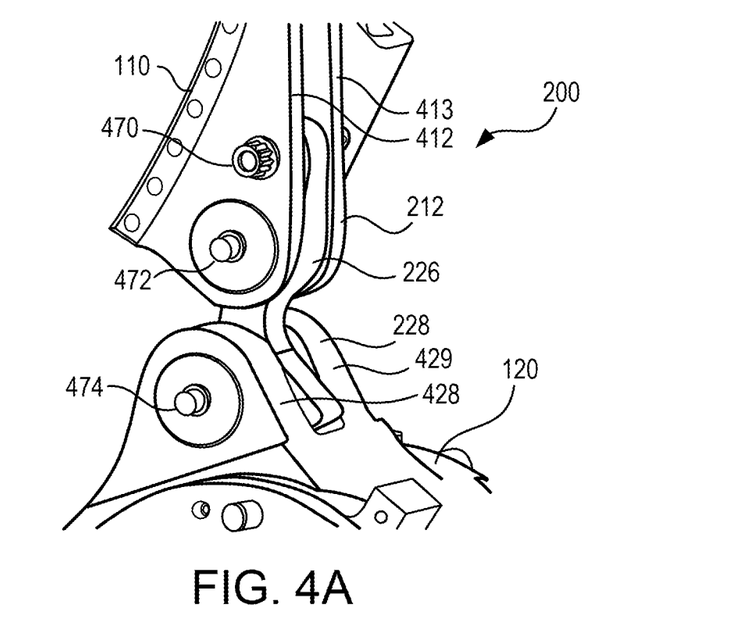
FIG. 4A provides a schematic perspective view of a gearbox mounting arrangement, with a side link mounted between and to an engine case attachment flange and a gearbox attachment flange, in accordance with various embodiments.
Figure 4B:
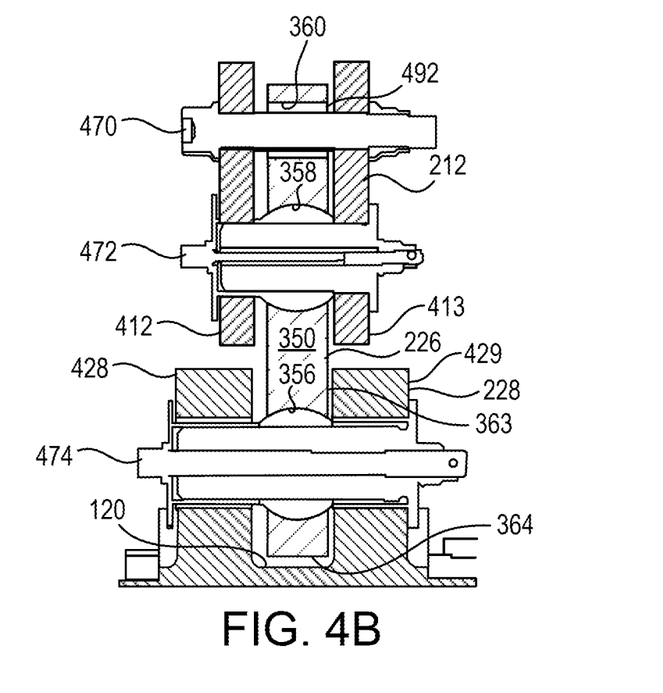
FIG. 4B provides a cross-section view of the gearbox mounting arrangement of FIG. 4A, in accordance with various embodiments.

Referring now to FIG. 4A and FIG. 4B, a perspective view and a section-view, respectively, of the arrangement 200 is illustrated, in accordance with various embodiments. In various embodiments, third aperture 360 is configured to receive a fastener 470 (e.g., a pin, a bolt, or the like) therethrough. Attachment flange 212 may comprise a first wall 412 and a second wall 413 spaced apart from the first wall 412. Side link 226 may be received between the first wall 412 and the second wall 413. Fastener 470 (also referred to herein as a third fastener) may extend from first wall 412 to second wall 413. Fastener 470 may be coupled to attachment flange 212 (via the first wall 412 and the second wall 413). In this manner, body 350 of side link 226 may be configured to contact fastener 470 at the third aperture 360 to prevent rotation of the side link 226 with respect to attachment flange 212. In various embodiments, with the side link 226 installed to the attachment flange 212, a gap 492 may exist between body 350 (at the third aperture 360) and fastener 470. Stated differently, the outside width (or diameter if the fastener 470 is round) of the fastener 470 may be less than the inside width (or diameter if the aperture 360 is round) of the aperture 360. For example, the outside width or diameter of the fastener 470 may be between 40% and 95% of the inside width or diameter of third aperture 360, between 50% and 90% of the inside width or diameter of third aperture 360, or between 70% and 90% of the inside width or diameter of third aperture 360, in accordance with various embodiments. In various embodiments, the gap 492 between fastener 470 and body 350 at the third aperture 360 is between 0.79375 mm (1/32 inch) and 9.525 mm (3/8 inch), between 2.38125 mm (3/32 inch) and 6.35 mm (1/4 inch), or about 3.175 mm (1/8 inch), wherein the term "about" in this context means±5%. In this manner, a predetermined (e.g., minimal) amount of rotation between engine case 110 and side link 226 may be allowed, for example to accommodate machining tolerances, thermal growth, vibration, or other factors which may cause minimal rotation of side link 226 about fastener 472 (also referred to herein as a second fastener) with respect to engine case 110. As described herein, fastener 470 may be offset from an axis of rotation (e.g., a centerline axis of fastener 472) of side link 226 with respect to attachment flange 212 to provide a stopping surface for restricting motion of gearbox 120 with respect to engine case 110 outside of a desired operational design space.

In various embodiments, second aperture 358 is configured to receive a fastener 472 (e.g., a pin, a bolt, or the like) therethrough. Fastener 472 may extend from first wall 412 to second wall 413. Fastener 472 may be coupled to attachment flange 212 (via the first wall 412 and the second wall 413). In this manner, side link 226 may be secured to attachment flange 212 via fastener 472. In various embodiments, side link 226 is configured to rotate a minimal rotational distance (i.e., limited by fastener 470 and third aperture 360) about fastener 472. In various embodiments, one or more bushings may be provided between fastener 472 and attachment flange 212 and/or between fastener 472 and side link 226.

In various embodiments, first aperture 356 is configured to receive a fastener 474 (e.g., a pin, a bolt, or the like) therethrough. Attachment flange 228 may comprise a first wall 428 and a second wall 429 spaced apart from the first wall 428. Side link 226 may be received between the first wall 428 and the second wall 429. Fastener 474 (also referred to herein as a first fastener) may extend from first wall 428 to second wall 429. Fastener 474 may be coupled to attachment flange 228 (via the first wall 428 and the second wall 429). In this manner, side link 226 may be secured to attachment flange 228 via fastener 474. In various embodiments, side link 226 is configured to rotate a minimal rotational distance (i.e., limited by contact surface 364 and gearbox 120) about fastener 474. In various embodiments, one or more bushings may be provided between fastener 474 and attachment flange 228 and/or between fastener 474 and side link 226.

Figure 4C:
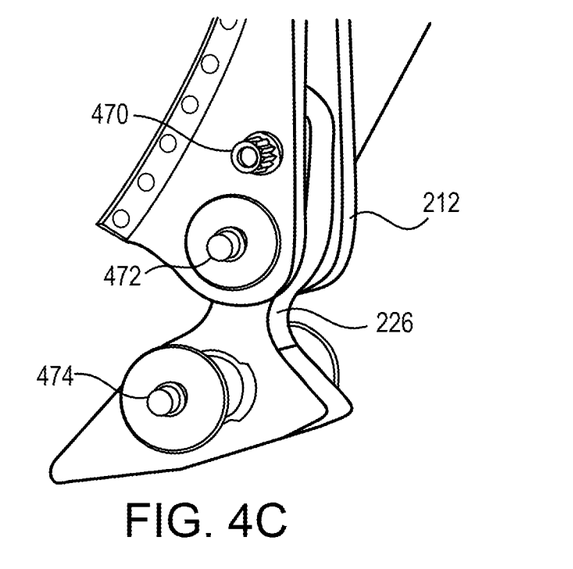
FIG. 4C provides a schematic perspective view of the gearbox mounting arrangement of FIG. 4A with the gearbox attachment flange omitted for clarity purposes, in accordance with various embodiments.
Figure 4D:
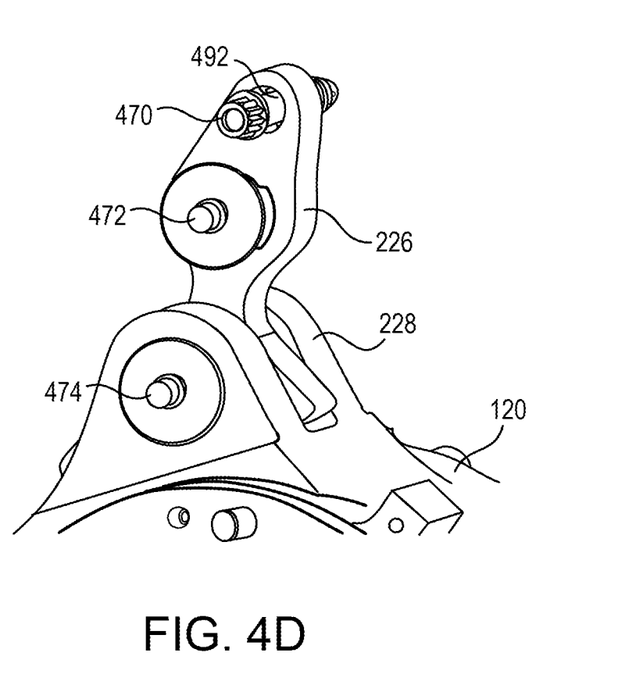
FIG. 4D provides a schematic perspective view of the gearbox mounting arrangement of FIG. 4A with the engine case attachment flange omitted for clarity purposes, in accordance with various embodiments.

With reference to FIG. 4C and FIG. 4D, perspective views of the arrangement 200 with the attachment flange 212 and the attachment flange 228 respectively omitted are illustrated, in accordance with various embodiments. As best seen in FIG. 4D, gap 492 between fastener 470 and side link 226 may comprise an annular geometry. In various embodiments, gap 492 is an annular gap extending circumferentially about a radial outer surface of fastener 470. Gap 492 may be configured to permit back and forth rotational movement, with respect to a central axis extending through fastener 472, of side link 226 within an operational design space.

Various benefits of the foregoing disclosure may be realized. For example, the various embodiments provide a manner for reducing motion of the gearbox to small distances in the radial direction following a high vibration and/or an overload event (e.g., a blade out event, among others). The various embodiments also provide a manner of maintaining a position of the gearbox without additional movement restriction devices.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An arrangement for mounting an auxiliary component to an engine case of a gas turbine engine, comprising:
   an engine case attachment flange configured for attachment to a flange of the engine case;
   a side link comprising a first end and a second end, the second end is configured to be coupled to the engine case attachment flange;
   a first aperture disposed in the first end of the side link;
   a first fastener configured to be received through the first aperture; a second aperture disposed in the second end of the side link; a second fastener configured to be received through the second aperture for coupling the side link to the engine case attachment flange;
   a third aperture disposed in the second end of the side link;
   a third fastener configured to be received through the third aperture for restricting rotational movement of the side link about the second fastener; and
   a contact surface disposed at the first end of the side link and configured to contact the auxiliary component, in response to rotation of the side link with respect to the auxiliary component, while the first fastener is received through the first aperture for coupling the side link to the auxiliary component, the second fastener is received through the second aperture for coupling the side link to the engine case attachment flange, and the third fastener is received through the third aperture for restricting the rotational movement of the side link about the second fastener,
   the contact surface at least partially defines a terminus of the first end of the side link, and
   the first aperture is located between the contact surface and the second aperture.

2. The arrangement of claim 1, wherein the second aperture is located between the first aperture and the third aperture.

3. The arrangement of claim 1, wherein a first gap is positioned between the third fastener and the side link.

4. The arrangement of claim 3, wherein the first gap is an annular gap extending circumferentially about a radial outer surface of the third fastener.

5. The arrangement of claim 4, wherein the first gap is configured to permit back and forth rotational movement, about a central axis extending through the second fastener, of the side link with respect to the engine case attachment flange.

6. The arrangement of claim 1, wherein the third aperture is aligned with the first aperture and the second aperture.

7. The arrangement of claim 1, further comprising an auxiliary component attachment flange, wherein the first end of the side link is configured to be coupled to the auxiliary component attachment flange via the first fastener.

8. The arrangement of claim 1, wherein a second gap is positioned between the contact surface and the auxiliary component, the second gap is configured to permit back and forth rotational movement, about a central axis extending through the first fastener, of the side link with respect to the auxiliary component attachment flange.

9. The arrangement of claim 1, wherein the first end of the side link is wider than the second end of the side link.

10. An arrangement for mounting an auxiliary component to an engine case of a gas turbine engine, comprising:
    an engine case attachment flange configured for attachment to a flange of the engine case; a side link comprising a first end configured to be coupled to an auxiliary component attachment flange and a second end configured to be coupled to the engine case attachment flange;
    a first aperture disposed in the first end of the side link; a first fastener configured to be received through the first aperture for coupling the side link to the auxiliary component attachment flange;
    a second aperture disposed in the second end of the side link; a second fastener configured to be received through the second aperture for coupling the side link to the engine case attachment flange; and
    a contact surface disposed at the first end of the side link, wherein the contact surface is configured to contact the auxiliary component, in response to rotation of the side link with respect to the auxiliary component, while the first fastener is received through the first aperture for coupling the side link to the auxiliary component and the second fastener is received through the second aperture for coupling the side link to the engine case attachment flange,
    the contact surface at least partially defines a terminus of the first end of the side link, and
    the first aperture is located between the contact surface and the second aperture.

11. The arrangement of claim 10, wherein a first gap is positioned between the contact surface and the auxiliary component.

12. The arrangement of claim 11, wherein the first gap is configured to permit back and forth rotational movement, about a central axis extending through the first fastener, of the side link with respect to the auxiliary component attachment flange.

13. The arrangement of claim 12, further comprising:
    a third aperture disposed in the second end of the side link; and
    a third fastener configured to be received through the third aperture for restricting rotational movement of the side link about the second fastener.

14. The arrangement of claim 13, wherein the second aperture is located between the first aperture and the third aperture.

15. The arrangement of claim 14, wherein a second gap is positioned between the third fastener and the side link.

16. The arrangement of claim 15, wherein the second gap is configured to permit back and forth rotational movement, about a central axis extending through the second fastener, of the side link with respect to the engine case attachment flange.

17. A gas turbine engine, comprising:
    an engine case; an engine case attachment flange coupled to the engine case; an auxiliary component comprising an auxiliary component attachment flange;
    a side link coupled between the auxiliary component attachment flange and the engine case attachment flange;
    a first aperture disposed in a first end of the side link;
    a first fastener received through the first aperture; a second aperture disposed in a second end of the side link;

a second fastener received through the second aperture for coupling the side link to the engine case attachment flange;

a third aperture disposed in the second end of the side link; a third fastener received through the third aperture for restricting rotational movement of the side link about the second fastener with respect to the engine case attachment flange; and a contact surface disposed at the first end of the side link and configured to contact the auxiliary component in response to rotation of the side link with respect to the auxiliary component, the contact surface at least partially defines a terminus of the first end of the side link, and the first aperture is located between the contact surface and the second aperture.

18. The gas turbine engine of claim 17, wherein a first gap is positioned between the contact surface and the auxiliary component, the first gap is configured to permit back and forth rotational movement, about a central axis extending through the first fastener, of the side link with respect to the auxiliary component attachment flange.

19. The gas turbine engine of claim 18, wherein a second gap is positioned between the third fastener and the side link; the second gap is configured to permit back and forth rotational movement, about a central axis extending through the second fastener, of the side link with respect to the engine case attachment flange.

\* \* \* \* \*